United States Patent [19]

Hoisington

[11] 4,303,922

[45] Dec. 1, 1981

[54] METHOD FOR REDUCING ERRORS DUE TO SOURCE AMPLITUDE MODULATION IN A SEQUENTIAL AMPLITUDE COMPARISON DIRECTION FINDING SYSTEM

[75] Inventor: David B. Hoisington, Carmel Valley, Calif.

[73] Assignee: The United States of America as represented by the Secretary of the Navy, Washington, D.C.

[21] Appl. No.: 126,240

[22] Filed: Mar. 3, 1980

[51] Int. Cl.³ .............................................. G01S 3/06
[52] U.S. Cl. .................................................... 343/114
[58] Field of Search ........................ 343/114, 115, 118

[56] References Cited

U.S. PATENT DOCUMENTS

| | | | |
|---|---|---|---|
| 2,938,206 | 5/1960 | Davis et al. | 343/118 X |
| 3,165,746 | 1/1965 | Whitnah | 343/113 R |
| 3,296,619 | 1/1967 | Alpers | 343/120 |
| 3,740,750 | 6/1973 | Moulton | 343/119 |
| 3,895,385 | 7/1975 | Alpers | 343/113 R |
| 3,906,505 | 9/1975 | Lipsky | 343/119 |

Primary Examiner—T. H. Tubbesing
Attorney, Agent, or Firm—R. S. Sciascia; Charles D. B. Curry; George L. Craig

[57] ABSTRACT

A technique and apparatus are disclosed which greatly reduce error in spinning antenna direction finding systems due to amplitude modulation of the source. A second omnidirectional antenna and its associated receiver are used in two alternative methods to reduce error. Embodiment one uses the second receiver, having automatic gain control, to control the gain of the first receiver, having input from the spinning antenna and outputting a signal for display. Embodiment two uses two log receivers, one receiving signals from the omnidirectional antenna and the other receiving signals from the spinning antenna. The outputs of the two log receivers are then combined and inputted to an amplifier which may have an inverse log characteristic and the amplifier signal outputted to a display.

5 Claims, 2 Drawing Figures

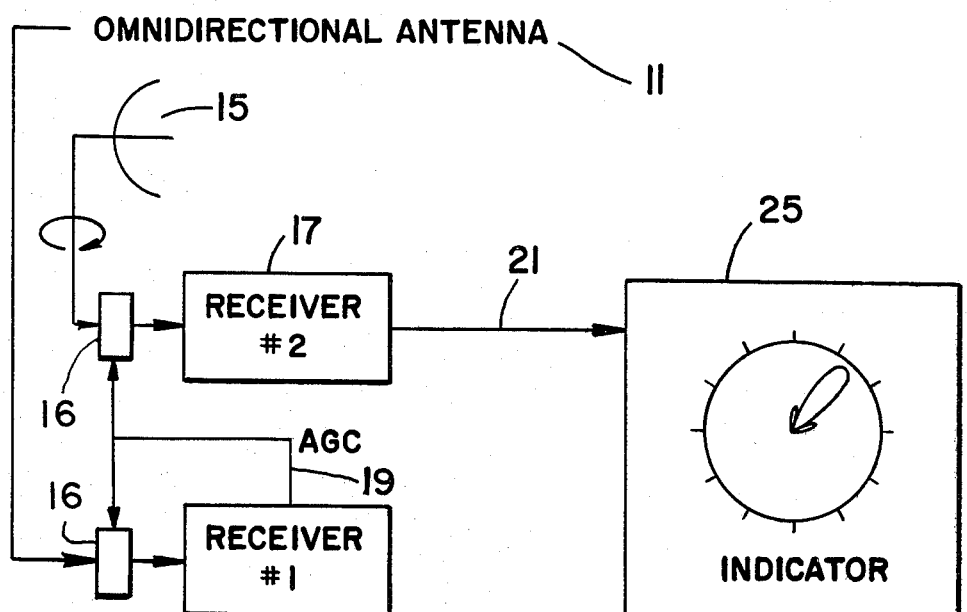
FIG_1
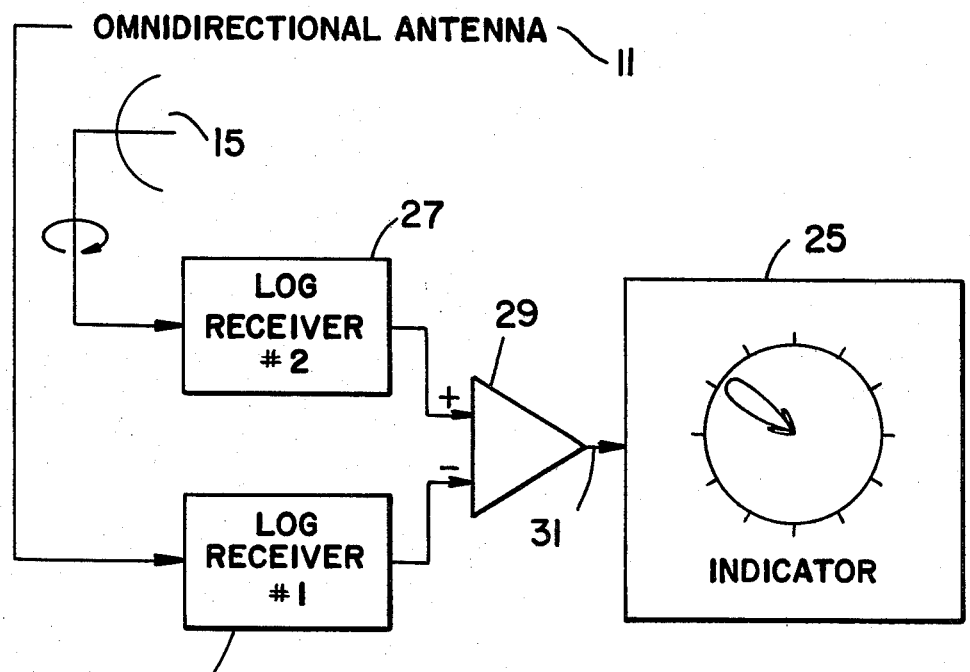
FIG_2

METHOD FOR REDUCING ERRORS DUE TO SOURCE AMPLITUDE MODULATION IN A SEQUENTIAL AMPLITUDE COMPARISON DIRECTION FINDING SYSTEM

BACKGROUND OF THE INVENTION

1. Field of the Invention

The instant invention relates to a method and apparatus for reducing the error of a direction finding system. More specifically, the invention relates to a method and apparatus for reducing the amplitude modulation error in a spinning antenna direction finding system. In particular, the invention relates to a method and apparatus, in two embodiments, for using two distinct antennas to reduce the amplitude modulation error of the spinning antenna in a direction finding system.

2. Description of Prior Art

Most direction finding systems customarily incorporate a direction-finding receiver mechanically and/or electronically tunable for receiving various frequencies broadcast by radiant energy sources. Usually, such a system also includes an azimuthally rotatable directional antenna. Both the Navy and Air Force have extensive use of rotating direction-finding (DF) antennas in airborne and surface applications. In electronic-countermeasures (ECM) applications, it is also desirable to include automatic gain control (AGC) circuitry to prevent overload of receiver while maintaining sensitivity to very high and very low received signals. It is common knowledge that in spinning antenna DF systems, considerable bearing error of the received radiant energy source can occur due to amplitude modulation of the source signal. The instant invention discloses two ways to accomplish reduction or elimination of such bearing error by compensation for the amplitude modulation of the source signal.

SUMMARY OF THE INVENTION

Briefly described are a technique and apparatus for reducing or eliminating bearing error in spinning antenna DF systems due to amplitude modulation of the source. Two antennas, one omnidirectional and one spinning and each having its own receiver, are used in the invention to provide two embodiments for compensating amplitude modulation error. Embodiment one uses the receiver associated with the omnidirectional antenna having AGC to control the gain of the receiver associated with the spinning antenna. The second embodiment uses two log receivers, each associated with its respective antenna, and combines the outputs from the log receivers in an optional inverse log amplifier such that compensation for amplitude modulation error is achieved.

A primary object of invention is to provide a two-antenna direction finding system having minimal bearing error.

A second object of invention is to combine an omnidirectional antenna and receiver with a spinning antenna and receiver to provide a highly accurate direction finding system.

Yet another object of invention is to provide a highly accurate direction-finding system using a spinning antenna by combining the received signal of the spinning antenna with the received signal of another omnidirectional antenna such that compensation for the amplitude modulation of the signal received by the spinning antenna is achieved.

BRIEF DESCRIPTION OF THE DRAWINGS

FIG. 1 shows a first embodiment of a direction finding system having compensation for source amplitude modulation.

FIG. 2 shows the preferred embodiment of a direction finding system having compensation for source amplitude modulation.

DESCRIPTION OF THE PREFERRED EMBODIMENT

It is common knowledge that in spinning antenna DF systems, considerable bearing error can result due to amplitude modulation of the source. Referring to FIG. 1, a first embodiment of the instant invention is shown which greatly decreases or eliminates such error. An omnidirectional antenna 11 receives signals from a radiant energy source and outputs a signal to its associated receiver 13. Simultaneously, a spinning antenna 15 receives signals from the same radiant energy source and outputs a signal to its associated receiver 17. Through internal or external AGC circuitry, the receiver 13 for the omnidirectional antenna 11 outputs an AGC voltage 19 to the receiver 17 for the spinning antenna 15, the AGC voltage 19 thus controlling the gain of receiver 17. Receiver 17 then outputs a signal 21 compensated for source amplitude modulation to an indicator display 25.

A minor variation of the first embodiment would be to place identical voltage-controlled attenuators 16 in the transmission lines between the antennas 11, 15 and their associated receivers 13, 17 and then control the attenuators with the AGC output of receiver 13.

In operation, the two receivers 13 and 17 have identical AGC characteristics and use a common local oscillator so that the same control may tune both receivers. The AGC in receiver 13 keeps its output signal 19 constant independent of variations in the strength of the source signal and thus variations in the output signal 21 of receiver 17 are due only to variations in the gain of the rotating antenna 15. The primary difficulty in implementing the first embodiment is obtaining two receivers having identical AGC characteristics over a wide dynamic range.

Referring to FIG. 2, the preferred embodiment of the instant invention is shown. In this embodiment, the omnidirectional antenna 11 receives a signal from a radiant energy source and outputs a signal to its associated log receiver 23. Simultaneously the spinning antenna 15 receives a signal from the radiant energy source and outputs a signal to its associated log receiver 27. The two log receivers 23, 27 each output a signal to an amplifier 29 which may have an inverse log characteristic and which then outputs a signal 31 independent of the source amplitude to a display 25.

In operation, if the signal level of the radiant source is A(t), then the output of receiver 23 is given by log [A(t)] and the output of receiver 27 is given by log [A(t)f($\phi$)] where f($\phi$) is the directional characteristic of the spinning antenna. The signals are then combined in the amplifier 29 according to the formula:

$$\log^{-1}\{\log [A(t)f(\phi)] - \log [A(t)]\} = f(\phi)$$

where f($\phi$) is the voltage signal 31 applied to the display 25 independent of the source amplitude. Without the optional inverse log characteristic the amplifier output is given by log f($\phi$). Regardless of the amplifier characteristic, the amplitude modulation is eliminated. As in the first embodiment common local oscillators would be used by the two receivers for single control tuning. The second embodiment may prove easier to instrument that the first because log amplifier technology is highly developed and well matched amplifiers having wide dynamic range are available.

What is claimed is:

1. A system for providing directional information about a radiant energy source comprising:
   (a) an omnidirectional antenna adapted to receive signals from a radiant energy source and having an output;
   (b) a spinning antenna adapted to receive signals from a radiant energy source and having an output;
   (c) a first receiver connected to said output of said omnidirectional antenna and having an output signal;
   (d) a second receiver connected to said output of said spinning antenna and having an output;
   (e) a first voltage attenuator connected between said omnidirectional antenna and said first receiver, said first voltage attenuator also receiving as input said output of said first receiver;
   (f) a second voltage attenuator connected between said spinning antenna and said second receiver, said second voltage attenuator also receiving as input said output of said first receiver; and
   (g) a display connected to said output of said second receiver for displaying directional information about said radiant energy source.

2. A system for providing directional information about a radiant energy source as recited in claim 1 wherein said output signal of said first receiver controls the characteristic output of said first and said second voltage attenuator.

3. A system for determining the angular position of a radiant energy source comprising:
   (a) an ominidirectional antenna adapted to receive signals from said radiant energy source and having an output;
   (b) a spinning antenna adapted to receive signals from said radiant energy source and having an output;
   (c) a first log receiver connected to said output of said omnidirectional antenna and having an output signal;
   (d) a second log receiver connected to said output of said spinning antenna and having an output signal;
   (e) an amplifier receiving said output signals of said first and second log receivers and having an output signal compensated for amplitude modulation of said radiant energy source; and
   (f) a display receiving said output signal of said amplifier and displaying directional information about said radiant energy source.

4. A system for determining the angular position of a radiant energy source as recited in claim 3 wherein said amplifier is an inverse log amplifier.

5. A system for determining the angular position of a radiant energy source as recited in claim 3 wherein said first and said second log receivers are matched in characteristics over a wide dynamic range.

* * * * *